June 29, 1943.  J. W. JEWELL  2,323,047
DISTILLATION
Filed June 4, 1940
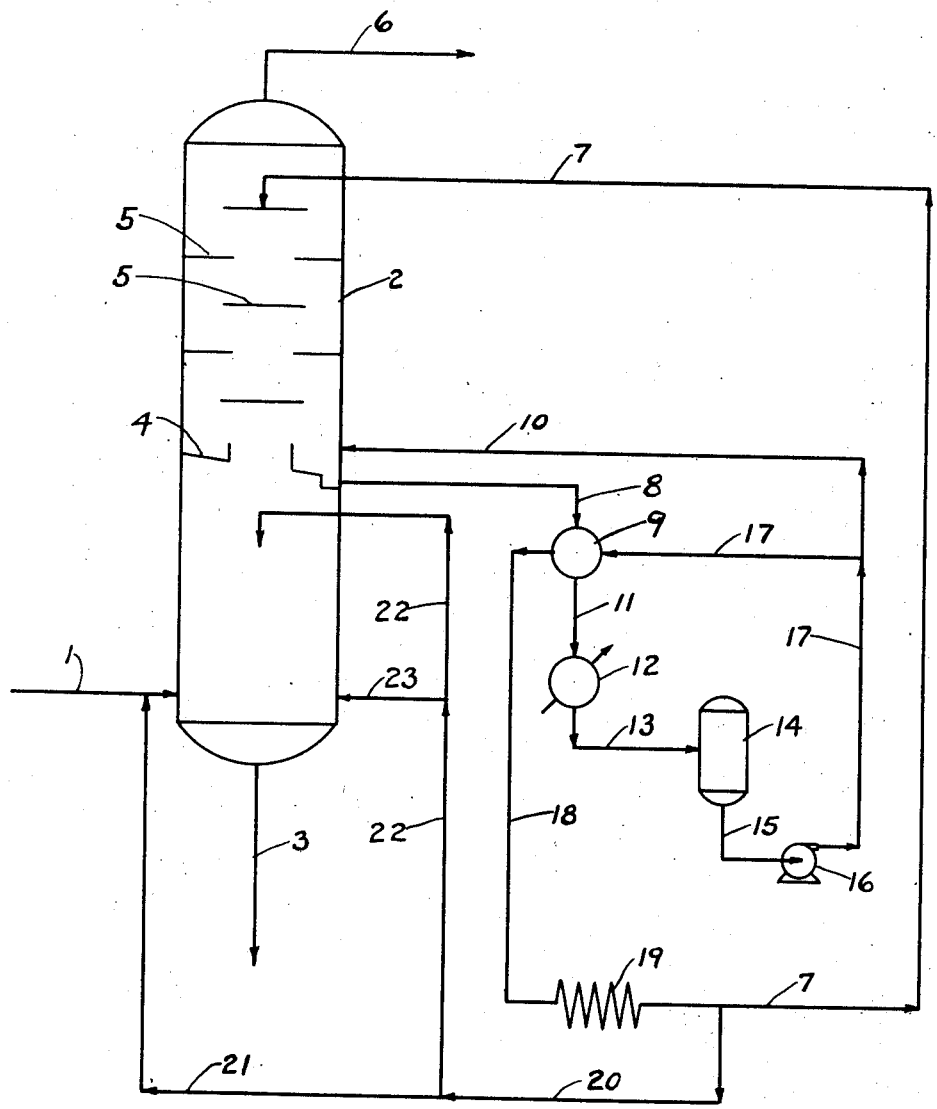
JOSEPH W. JEWELL.
INVENTOR
BY E. F. Liebrecht
ATTORNEY Patented June 29, 1943

2,323,047

UNITED STATES PATENT OFFICE 2,323,047

DISTILLATION

Joseph W. Jewell, Summit, N. J., assignor to The M. W. Kellogg Company, Jersey City, N. J., a corporation of Delaware Application June 4, 1940, Serial No. 338,687

8 Claims. (Cl. 196—71)

This invention relates to the art of distilling multi-component mixtures, and is particularly concerned with distilling operations wherein relatively low reflux duties must be employed.

The reflux duty performed in a distillation column may be defined as the quantity of heat given up by that portion of the distillate vapors which is condensed to a liquid and passed back down through the column. If, as is sometimes necessary, a distillation column is operated with a very low reflux duty, then the amount of reflux condensate flowing down through the column is correspondingly small.

When a highly heated feed stock is introduced into a distillation column, there may be very rapid disengagement of vapors from unvaporized heavier material. The vapors then tend to break up the liquid into fine droplets, which are entrained as a mist and carried up into the tower. This is of no consequence if a moderate amount of reflux is available, for the downward flow of the reflux liquid over the baffles or trays in the tower effectively scrubs entrained liquid particles out of the rising vapors. When the reflux duty must be low, however, there may be insufficient reflux liquid flowing to prevent carryover of entrained residual material in the vapors leaving the column. Such carryover is very undesirable, for it defeats the purpose of the distillation.

The main object of my invention is to enable a distillation column to be operated with a low reflux duty without the overhead vapors being contaminated with entrained heavier material, and I achieve this object by introducing into the top of the column a stream of hot liquid having a relatively high boiling point and derived from the distillate vapors. This liquid is allowed to flow down through the column along with the true reflux, and is introduced in sufficient quantity to perform the scrubbing or washing of the rising vapors for which the reflux alone is inadequate. The addition of this auxiliary wash liquid need not affect the reflux duty, because it does not vaporize and absorb heat to any appreciable extent; being introduced hot, it does not necessarily cause the condensation of true reflux from the vapors with which it first comes in contact, and in fact may be introduced at a sufficiently high temperature to reduce the amount of reflux condensed as a result of heat losses from the column to the atmosphere. My invention further contemplates the collection of wash liquid on a trapout pan at an intermediate point in the tower, whence it is withdrawn for re-use. The invention has other objects and advantages which will be pointed out in connection with the more detailed description which follows.

The requirement that a distillation column be operated within minimum reflux duty is met with most frequently when for some reason there is a critical temperature above which the material to be distilled must not be heated. The reflux duty of a distilling operation represents excess heat which must be available over and above the amount of heat necessary to vaporize the desired overhead fraction. If the amount of heat which can be supplied to the column without exceeding a given temperature limitation is only slightly greater than or substantially equal to that necessary to vaporize the desired overhead fraction, then obviously there is little or no excess heat which can be expended as reflux duty. If more than the allowable amount of heat is expended, some of the material desired as overhead product will be left in the bottoms.

A typical situation of the type just described is encountered in stripping heavy gas oil fractions out of reduced crude petroleum. If such a feed stock is subjected to temperatures above about 750° F. for any appreciable period it will undergo thermal decomposition, which may result in the formation of coke and is undesirable for numerous other reasons. In order to vaporize a maximum amount of the high boiling gas oil it is necessary to use as high a temperature as possible, and to keep the oil at this temperature no longer than is absolutely necessary so as to avoid thermal decomposition. No marginal temperature range is available, and no excess heat can be supplied to be expended as reflux duty. It will be seen that the situation is one in which my invention is of utility.

In describing the invention in greater detail and with reference to the annexed drawing it will be convenient to consider a reduced crude stripping operation as an exemplary embodiment of the invention. It is to be understood, however, that this choice is made for illustrative purposes only and in no way limits the scope of my invention. The drawing is a diagrammatic flow sheet from which conventional elements such as valves and control instruments have been omitted for greater simplicity.

In the drawing, line 1 represents a flowing stream of highly heated and partially vaporized petroleum oil, said oil being of the nature of reduced crude oil and containing a distillable fraction and a heavy, tarry fraction. Column 2 is an evaporator tower in which it is desired to vaporize and recover as much as possible of the distillable fraction of the oil entering through line 1. The requirement of maximum distillate recovery necessitates introducing the oil in line 1 at as high a temperature as can safely be employed without risking excessive coke deposition in column 2, and heat losses from column 2 would alone result in more condensation of distillate than is desired. It is therefore advantageous to employ no additional reflux duty and to counteract the effects of heat losses by radiation and convection to a certain exent. Also, the vapors passing overhead from column 2 are required to be free of entrained particles of heavy bottoms.

Entering column 2 through line 1 the highly heated reduced crude separates into a vapor and a liquid. The liquid, comprising the heavy residue, is withdrawn from the bottom of column 2 through line 3 and disposed of as desired. The vapors, carrying entrained liquid particles, traverse the central opening in a trapout pan 4, above which they are scrubbed by a stream of liquid flowing downwardly over the baffles 5. All entrained particles are separated from the vapors by the liquid so that a substantially clean overhead product passes out of the top of column 2 in vapor form via line 6 to be disposed of as desired.

As the described procedure continues, heat is being lost by radiation and convection from the external surface of column 2. The loss of this heat causes a certain proportion of the rising vapor to condense and mingle with the liquid flowing down over baffles 5. In order that the condensation of vapor shall be less than that corresponding to the unavoidable heat losses, I introduce a wash liquid into the column above the top baffle through line 7 at a temperature sufficiently high that condensation of vapor in excess of the desired amount will be prevented. In other words, I add sufficient heat to the contents of column 2 in the wash liquid to partially counteract the loss of heat by radiation and convection. Stated another way, I add hot wash liquid to raise the top temperature of the tower nearer to the bottom temperature than it would be if unavoidable heat loss were not so counterbalanced.

It will be observed that the quantity and temperature of the wash liquid determine the amount of heat added to the tower. Since both these variables are susceptible of control, I am in a position to smooth out fluctuations in top temperature and rate of vapor condensation caused by changing atmospheric conditions, which affect the rate at which heat is lost by radiation and convection.

Leaving the lowermost of the baffles 5 the wash liquid, now containing heavy material which has been scrubbed out of the vapors and a small proportion of condensed distillate, drops on to a collecting pan or trapout 4, from which it is withdrawn through line 8 and passed to a heat exchanger 9. In order to avoid all possibility of coking in the heat exchanger, I introduce a small amount of relatively cold oil on to trapout 4 through line 10, which mingles with the wash oil-condensate mixture and cools it. The quantity or temperature of this cold oil may be varied as desired to produce any suitable temperature in the stream traversing line 8.

In exchanger 9 the liquid mixture is cooled further and after traversing line 11 is finally cooled with water in cooler 12 to a temperature such that it can be passed through line 13 to an accumulator or surge drum 14, and stored therein for a brief period without danger of coke formation. An additional reason for cooling the mixture is that this protects pump 16. As is well known, pumping high temperature liquids containing volatile constituents is difficult and the requisite pumps are relatively expensive.

Leaving surge drum 14 through line 15 the mixture is picked up by pump 16 and passed through line 17. A portion of the cool mixture is diverted through line 10 to the trapout pan 4 for protective cooling as previously described. The remainder continues through line 17 to exchanger 9 where it is reheated by indirect contact with the relatively hot liquid coming from trapout 4 through line 8. Leaving exchanger 9 through line 18 the mixture next traverses a heating coil 19 which may be of any suitable type such as a tubular coil in a furnace setting, adapted to absorb heat from hot products of combustion. In coil 19 the mixture is heated to a temperature approximating the temperature at the top of column 2, and continues through line 7. A portion of the highly heated mixture is diverted through line 20 to be disposed of as hereinafter described, while the remainder continues via line 7 to be introduced above the top tray or baffle in column 2 as the hot wash liquid previously referred to.

It will be observed that subsequent to its entering the column through line 7 the hot wash liquid is increased in volume by the mixture therewith of two different materials. The first of these is the small amount of entrained material which is extracted from the rising vapors. The second is the condensate comprising the small amount of true reflux desired to be condensed in column 2. It may be said that this condensate should be revaporized at the slightly higher temperature prevailing in the lower portion of the column just above trapout 4, but when this occurs there is a simultaneous condensation of heavier material which replaces the revaporized original condensate. This comprises, of course, the fractionating effect which the use of reflux is normally desired to produce.

In order to avoid a constant increase in the volume of the wash liquid in circulation, and a progressive contamination thereof with tarry material extracted from the distillate vapors, I constantly divert a portion through line 20, as previously mentioned, and return it to the base of column 2. The point of reintroduction of this bleed-off stream is optional, and lines 21, 22 or 23 may be employed as desired. Lines 22 and 23 return the stream to the tower above and below the flashing level respectively, while line 21 joins line 1 carrying fresh hot reduced crude to be flashed.

The wash oil returned to the base of column 2 is redistilled by the heat of the fresh reduced crude, so that extracted heavy matter is withdrawn with the residue through line 3 while distillable constituents are revaporized with freshly distilled material.

In order to establish a quantity of wash oil of suitable properties in the circulating system described, I may fill the surge drum 14 initially with any high boiling distillate oil which may happen to be available, and commence the operation of the column with the temperature of the wash oil introduced throuh line 7 at such a low point that more than the desired amount of reflux is condensed. As the system continues to operate, the fractionating effect will automatically replace the original wash oil with heavy material comprising the heaviest constituents of the vapors passing up through the tower. As the composition of the wash oil approaches equilibrium with the vapors I gradually increase the amount of heat added in coil 19 until the reflux duty is reduced to the desired point.

As previously mentioned, the actual reflux duty existing in this embodiment of my invention is equal to the difference between the heat loss to the atmosphere and the net heat added in coil 19 over and above that removed in cooler 12. In the event that column 2 is so well insulated that the allowable reflux duty is greater than the heat lost to the atmosphere, I simply introduce the wash oil at a somewhat lower temperature, so that it will cool the vapors slightly and condense from them the desired quantity of reflux. An important advantage of the invention, however, is that it enables heat to be added to a distillation column and thereby enables the maintenance of very low reflux duties without employing unusually heavy insulation. Note should be taken of the fact that my invention relates only to distillation processes in which the reflux duty must be very low, and that therefore the amount of condensation effected, whether by heat loss to the atmosphere or by introducing the wash oil at a temperature below that of the rising vapors, is in no case sufficient to provide adequate entrainment removal by itself. The only compelling reason for permitting any condensation at all in practicing my invention, is that if this is not done there can be no bleed-off to prevent accumulation of tarry matter. The continuous admixture of small amounts of condensate with the wash oil enables the quality of the wash oil to be maintained.

In commercial practice my invention is readily adaptable to automatic control; for example, the flow through line 20 may be controlled by a valve positioned by a liquid level actuated device in surge tank 14.

My invention is particularly advantageously employed in connection with high temperature vapor phase catalytic hydrocarbon conversions such as catalytic cracking. Because of the superior quality of the motor fuel produced by the latter process, it is desirable that as much of the vaporizable heavier fractions of petroleum be recovered in suitable condition for treatment thereby. Since the life of a cracking catalyst is limited by the deposition of coke thereon, and since the heavy ends of petroleum residue are more productive of coke than distillable materials, it can readily be seen that the recovery of a maximum yield of distillate vapors free from residue, as is possible by means of my process, is a result greatly to be desired. The high temperatures attainable in the overhead vapors by my process require that less heat be added thereafter and prior to passage of such vapors to a catalytic converter. This is also advantageous, as the heating of vapors is a relativley inefficient operation.

While the invention has been described with reference to the treatment of a particular distillate it is to be understood that no limitation of the invention is implied thereby, nor by the particular arrangement of apparatus shown and described for illustrative purposes. My invention is limited only in and by the following claims, in which I wish to claim all novelty residing in my invention.

I claim:

1. A method of removing entrained particles of bottoms product from distillate vapors passing upwardly through a distillation column when the quantity of condensate from said vapors flowing downwardly in said column is insufficient to effect such removal, the feed to said column being a multi-component mixture, which comprises increasing the liquid downflow in said column by introducing a wash liquid derived from and substantially in equilibrium with said distillate vapors into the top of said column, the temperature of said liquid as it enters said column being high enough to prevent any substantial condensation of said vapors in said column, and collecting the liquid flowing downwardly in said column at an intermediate point of said column below the point of introduction of said wash liquid and withdrawing said collected liquid from said column.

2. A method of removing entrained particles of bottoms product from distillate vapors passing upwardly through a distillation column when the quantity of condensate from said vapors flowing downwardly in said column is insufficient to effect such removal, the feed to said column being a multi-component mixture, which comprises increasing the liquid downflow in said column by introducing a wash liquid derived from and substantially in equilibrium with said distillate vapors into the top of said column, the temperature of said liquid as it enters said column being high enough to prevent any substantial condensation of said vapors in said column, collecting the liquid flowing downwardly in said column at an intermediate point of said column below the point of introduction of said wash liquid and withdrawing said collected liquid from said column, returning a portion of said withdrawn liquid to said column at a point below said intermediate collecting point, and using another portion of said withdrawn liquid as the wash liquid introduced above said intermediate collecting point.

3. A method of removing entrained particles of bottoms product from distillate vapors passing upwardly through a distillation column when the quantity of condensate from said vapors flowing downwardly in said column is insufficient to effect such removal, the feed to said column being a multi-component mixture, which comprises increasing the liquid downflow in said column by introducing a wash liquid derived from and substantially in equilibrium with said distillate vapors into the top of said column, the temperature of said liquid as it enters said column being high enough to prevent any substantial condensation of said vapors in said column, collecting the liquid flowing downwardly in said column at an intermediate point of said column below the point of introduction of said wash liquid and withdrawing said collected liquid from said column, and using a portion of said withdrawn liquid as the wash liquid introduced above said intermediate collecting point.

4. A method of distillation which comprises scrubbing entrained liquid particles out of distillate vapors rising through a distillation column by means of a liquid introduced into the top of said column, said liquid being derived from the material undergoing distillation and in equilibrium therewith and being at a temperature high enough to prevent any substantial condensation of vapors in said column.

5. A method of stripping a heavy hydrocarbon oil of distillable fractions in a distillation column wherein vapors of said distillable fractions entrain and carry upward through said column particles of the undistillable portion of said heavy hydrocarbon oil and wherein substantially no liquid is desired to be condensed from said vapors and caused to flow downwardly through said column which comprises increasing the liquid downflow in said column by introducing into the upper portion of said column a stream of wash oil derived from said vapors and substantially in equilibrium therewith, said wash oil being introduced at a temperature high enough to substantially prevent any condensation of said vapors in said column, causing said wash oil to flow downwardly in countercurrent contact with said vapors to wash entrained matter out of said vapors, collecting said wash oil at an intermediate point in said column, and withdrawing it from said column.

6. A method of stripping a heavy hydrocarbon oil of distillable fractions in a distillation column wherein vapors of said distillable fractions entrain and carry upward through said column particles of the undistillable portion of said heavy hydrocarbon oil and wherein substantially no liquid is desired to be condensed from said vapors and caused to flow downwardly through said column which comprises increasing the liquid downfall in said column by introducing into the upper portion of said column a stream of wash oil derived from said vapors and substantially in equilibrium therewith, said wash oil being introduced at a temperature high enough to substantially prevent any condensation of said vapors in said column, causing said wash oil to flow downwardly in countercurrent contact with said vapors to wash entrained matter out of said vapors, collecting said wash oil at an intermediate point in said column, cooling at least a portion of the thus collected liquid, thereafter reheating at least a portion of said cooled portion of said liquid and using at least a portion of said reheated portion as the wash oil introduced into the upper portion of said column.

7. A method of distilling a maximum amount of clean vapors from a hydrocarbon oil containing a heavy fraction incapable of being distilled without thermal decomposition, which comprises introducing said oil into a flashing zone at an elevated temperature just low enough to prevent appreciably rapid thermal decomposition of said heavy fraction, flashing vapors from said oil in said zone, passing said vapors containing entrained liquid particles into the lower portion of a scrubbing zone, introducing a wash oil which is substantially in equilibrium with and at a temperature high enough to substantially prevent any condensation of said vapors into the upper portion of said scrubbing zone, countercurrently contacting said wash oil with said vapors in said zone to scrub entrained liquid particles out of said vapors while condensing at most only a very small portion of said vapors, collecting said wash oil now containing liquid scrubbed out of said vapors and a small portion of condensate in the lower portion of said scrubbing zone, withdrawing the collected wash oil from said scrubbing zone, separating from said withdrawn wash oil a portion approximately equal in volume to the wash oil originally introduced into said scrubbing zone, using said separated portion to scrub additional quantities of said vapors, and introducing the remainder of said withdrawn wash oil into said flashing zone.

8. A method of distilling a maximum amount of clean vapors from a hydrocarbon oil containing a heavy fraction incapable of being distilled, which comprises introducing said oil into a flashing zone at an elevated temperature, flashing vapors from said oil in said zone, passing said vapors into the lower portion of a scrubbing zone, introducing a wash oil which is substantially in equilibrium with and at a temperature high enough to substantially prevent any condensation of said vapors into the upper portion of said scrubbing zone, countercurrently contacting said wash oil with said vapors in said zone to scrub entrained particles out of said vapors while condensing at most only a very small portion of said vapors, collecting said wash oil now containing liquid scrubbed out of said vapors and a small portion of condensate in the lower portion of said scrubbing zone, withdrawing the collected wash oil from said scrubbing zone, and using a portion thereof to scrub additional quantities of said vapors.

JOSEPH W. JEWELL.